Dec. 19, 1933.     R. E. LEE     1,939,905
MOTOR CONTROL
Filed April 22, 1932     2 Sheets-Sheet 1

Inventor
Robert E. Lee
By C. A. Snow & Co.
Attorneys.

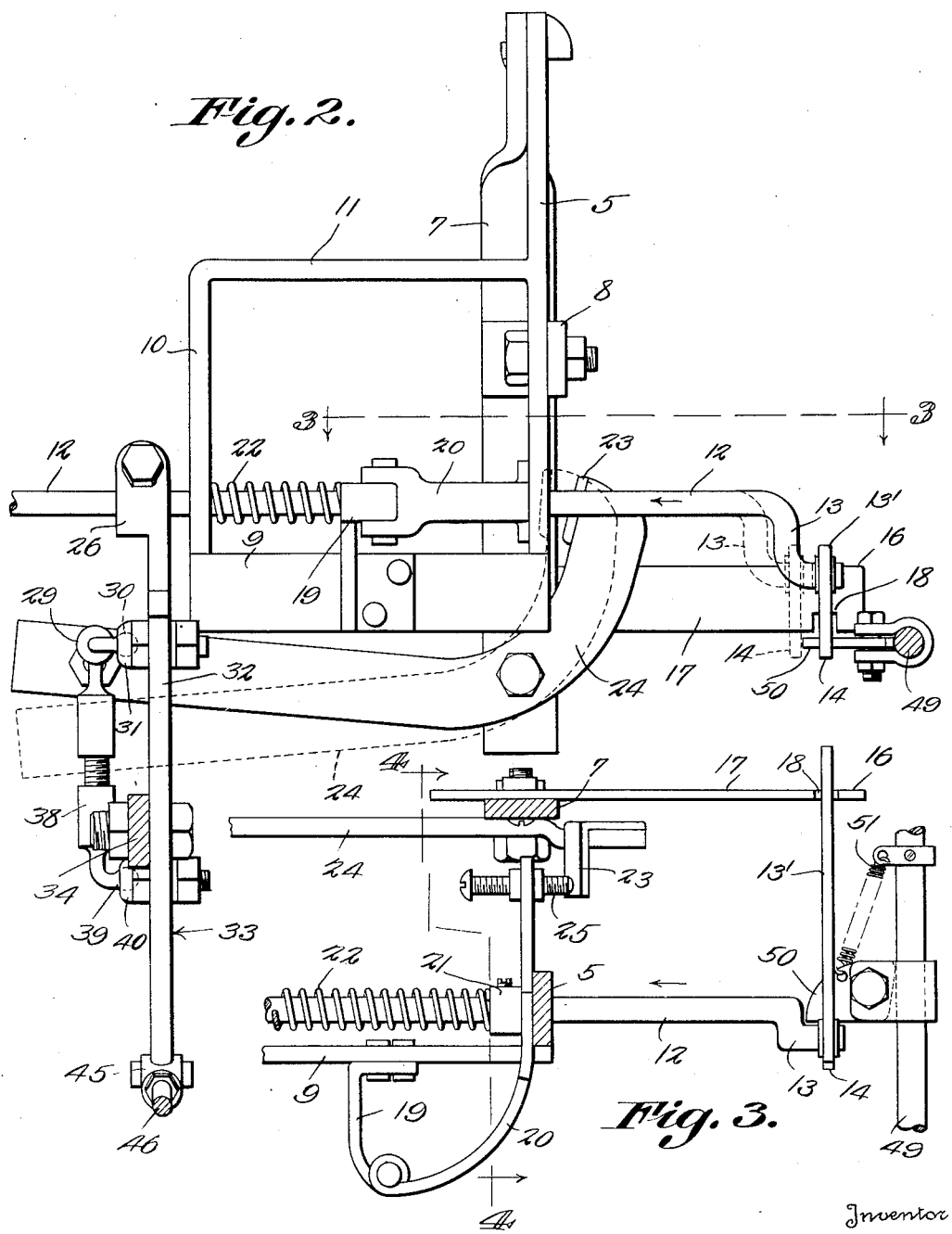

Patented Dec. 19, 1933

1,939,905

UNITED STATES PATENT OFFICE 1,939,905

MOTOR CONTROL

Robert E. Lee, Temple, Tex.

Application April 22, 1932. Serial No. 606,947

6 Claims. (Cl. 192—.01)

This invention relates to a device designed for use in connection with motor vehicles, the primary object of the invention being to provide means for automatically operating the gas control rod to feed gas to the engine as the clutch pedal is released, and the foot of the operator is being transferred from the clutch pedal to the accelerator pedal.

An important object of the invention is the provision of a device of this character which may be readily and easily secured to the engine of a vehicle, eliminating the necessity of making alterations in the engine construction to mount the device.

Another object of the invention is to provide an automatic gas control means which will not in any way interfere with the normal operation of the gas control rod.

With the foregoing and other objects in view, which will appear as the description proceeds, the invention resides in the combination and arrangements of parts and in the details of construction hereinafter described and claimed, it being understood that changes in the precise embodiment of the invention herein disclosed may be made within the scope of what is claimed, without departing from the spirit of the invention.

Referring to the drawings:

Figure 2 is a front elevational view of the device.

Figure 3 is a fragmental plan view of the device.

Figures 1, 4:
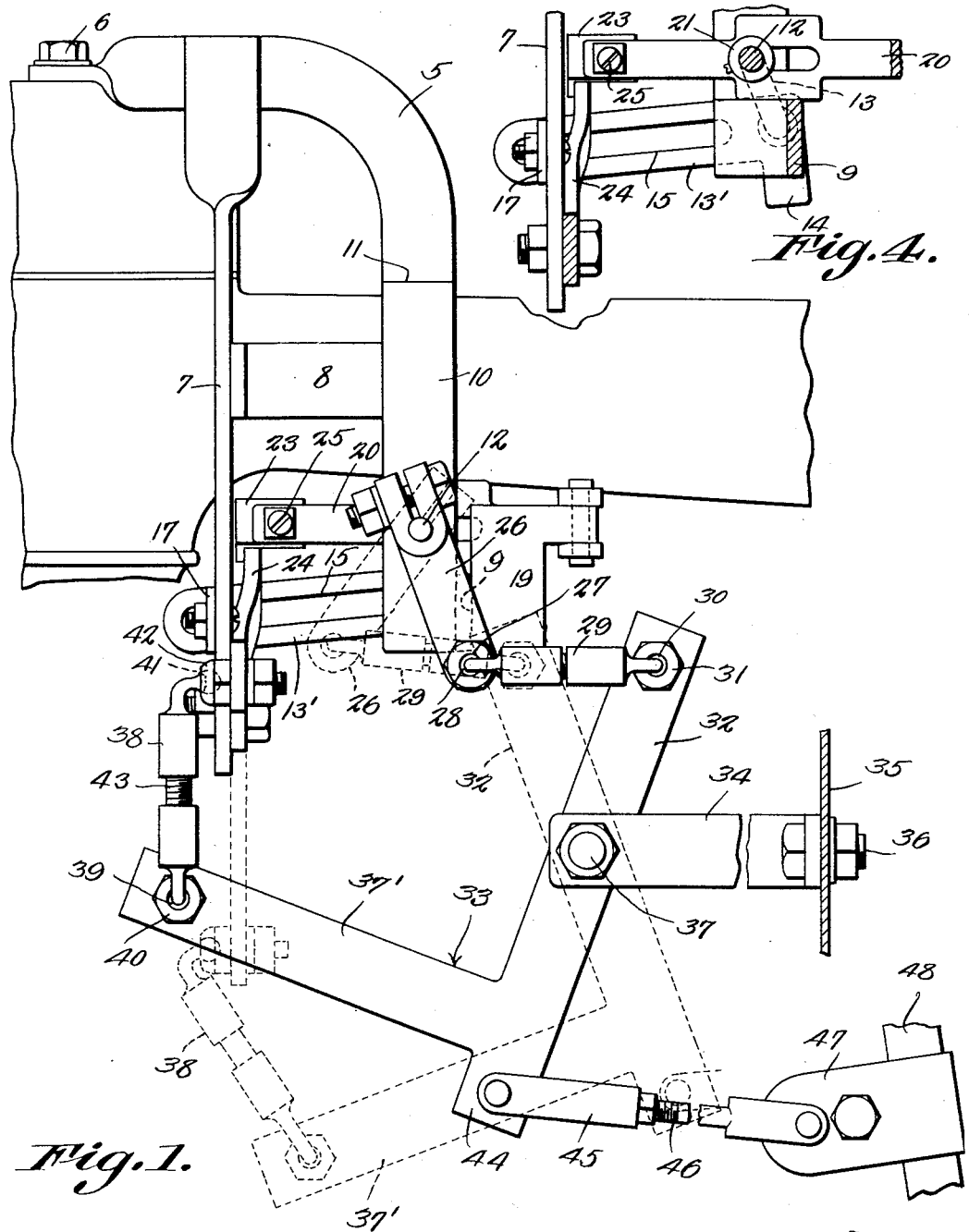
Figure 1 is an elevational view of a device constructed in accordance with the invention, the same being shown as secured to the intake manifold of an engine.
Figure 4 is a sectional view taken on line 4—4 of Figure 3.

Referring to the drawings in detail the device comprises a frame embodying a curved arm 5, the forward end thereof being flattened and apertured to receive the bolt 6 used in securing the intake manifold of the engine. This frame also includes a vertical bar 7 that has its upper end rigidly secured to the curved arm 5.

Brace arm 8 is disposed between the curved arm 5 and vertical bar 7, holding the arm 5 and bar 7 in spaced relation with each other.

Extending laterally from the curved arm 5, is a bar 9, that connects with the bar 10 formed with a horizontal extension 11 that also forms a part of the curved arm 5.

Aligning openings are formed in the arm 5 and bar 10, which openings receive the rod 12 that has a right angled end portion 13. The right angled end portion 13 is disposed in an opening of the plate 13', that has a downwardly extended lip 14. This plate 13' is also formed with an elongated opening 15 in which the head 16 of the supporting arm 17 is disposed. The supporting arm 17 is formed with a reduced portion 18 adjacent to the head 16, which reduced portion is so constructed that movement of the plate 13' longitudinally of the supporting arm 17 is permitted, for purposes to be hereinafter more fully described.

Extending from the bar 9, is a bracket 19 to which the lever 20 is pivotally connected. This lever 20 is formed with elongated openings through which the rod 12 extends, the rod 12 being provided with an adjustable stop 21 that contacts with the lever 20, so that movement of the lever will result in a movement of the rod 12 to draw the plate inwardly towards the frame.

A coiled spring indicated by the reference character 22 engages the stop 21 and acts to urge the rod 12 to its normal or extended position.

The lever 20 is substantially long and extends to a point adjacent to the flange 23 which is extended from the pivoted arm 24, the lever being provided with a screw 25 that contacts with the pivoted arm, so that movement of the pivoted arm will be transmitted to the lever 20 to move the lever.

Adjustably mounted on one end of the rod 12, is an arm 26, which is provided with a socket member 27 in which the head 28 of the adjustable connecting member 29 operates. The connecting member 29 is also provided with a head 30 at the opposite end thereof, which head 30 operates in the socket member 31 supported at one end of the arm 32 of the lever 33. The support for the lever 33 comprises an arm 34, that is bolted to the motor vehicle frame 35, by means of the bolt 36.

A pivot bolt indicated at 37 passes through the arm 32 of the lever 33 pivotally mounting the lever. Extending at right angles to the arm 32, is an arm 37' to which the connecting member 38 is conected, the connection between the connecting member 38 and arm 37' being made through the head 39 and socket member 40. This connecting member 38 is formed with a head 41 at its opposite end, that is fitted in the socket member 42.

A threaded shank 43 provides means for adjusting the throw of the lever 33, by moving the sections of the connecting member 38, towards or away from each other.

As clearly shown by Figure 1 of the drawings, the arm 32 is provided with an extension 44 to which the member 45 is pivotally connected, the member 45 being in the form of a yoke provided with a threaded opening to receive the threaded end of the rod 46, which rod also connects with the clamp 47 of a construction to clamp around the shank 48 of the clutch pedal.

Thus it will be seen that due to this construction, the operation of the device will be controlled by the operation of the clutch pedal of the vehicle.

The gas control rod is indicated by the reference character 49 and operates adjacent to one end of the plate 13. Mounted on the rod is a pivoted finger 50 designed to be engaged by the lip 14 of the plate 13 as the plate 13 is moved to operate the rod 49 to feed gas to the engine.

This finger 50 is so constructed that it may swing in one direction, but is restricted from movement in the opposite direction. A spring 51 acts to normally urge the finger to its active position.

The operation of the device is as follows: When the clutch pedal is forced downwardly, the lever 33 takes a position as shown in full lines in Figure 1 of the drawings, and when the foot of the operator is removed from the clutch pedal, the clutch pedal moving to its normal or active position, will operate to tilt the lever 33, moving the lever to the position as shown in dotted lines in Figure 1 of the drawings.

With this movement of the clutch pedal to its normal position, the rod 12 is rocked moving the plate 13 causing the lip 14 to engage the pivoted finger 50, forcing the gas control rod 49 downwardly, automatically feeding gas to the motor.

As the clutch pedal assumes its normal position, the arm 24 moves causing the flange 23 to engage the screw 25, moving the lever 20 and rod 12 in the direction of the arrow as shown by Figure 3 of the drawings. Due to this movement, the lip 14 is moved laterally out of the path of the pivoted finger 50, and is held in this position so that the gas control rod may be operated in its usual way.

It will of course be obvious that when the clutch pedal is again forced downwardly to throw out the clutch, the rod 12 and plate 13 return to the position as shown by Figure 3, where the lip 14 lies within the path of travel of the pivoted finger 50, so that upon return movement of the clutch pedal to its normal position, the gas control rod will be again operated.

Due to this construction, it will be seen that the gas control rod 49 is automatically operated to feed gas to the engine, as the operator's foot is removed from the clutch pedal to be positioned on the accelerator pedal, eliminating the possibility of the engine stalling, due to an insufficient quantity of gas being supplied to the engine at the time the clutch is thrown into operation.

I claim:

1. The combination with the clutch pedal and accelerator rod of a motor vehicle, of a control mechanism comprising a frame mounted on the motor of the vehicle, pivoted levers mounted on the frame, a rod mounted for pivotal movement on the frame, and having a right angled end portion extending to a position adjacent to the accelerator rod, a pivoted arm carried by the accelerator rod, means mounted on the right angled end portion of the last mentioned rod for engaging the arm to move the accelerator rod to feed gas to the motor of the vehicle, and means for moving the rod to release the arm and accelerator rod.

2. The combination with the accelerator rod and clutch pedal of a motor vehicle, of a controlling mechanism comprising a frame mounted on the motor of the vehicle, a plurality of levers mounted on the frame, a rod mounted for pivotal movement on the frame, means for transmitting movement of the levers to the rod to operate the last mentioned rod, means for adjusting the throw of the levers to adjust the movement of the rod, means for transmitting movement of the last mentioned rod to the accelerator rod to control the passage of gas to the motor, and means for transmitting movement of the clutch pedal to the levers.

3. The combination with the accelerator rod and clutch pedal of a motor vehicle, of a control mechanism comprising a frame, levers mounted on the frame, a horizontally disposed rod mounted on the frame, and rotated by the levers, a plate mounted at one end of the horizontally disposed rod, a lip forming a part of the plate, a pivoted arm secured to the accelerator rod, said lip being disposed in the path of travel of the pivoted arm to operate the accelerator rod, means for transmitting movement of the clutch pedal to the levers to operate the horizontally disposed rod, and means for simultaneously sliding the horizontally disposed rod laterally to move the lip out of the path of travel of the pivoted arm.

4. The combination with the accelerator rod and clutch pedal of a motor vehicle, of an operating mechanism comprising a frame, levers mounted on the frame, means for transmitting movement of the clutch pedal to the levers, a reciprocating plate mounted on the frame, a pivoted arm mounted on the accelerator rod, said arm lying in the path of travel of the plate to move the rod as the plate reciprocates, means for transmitting movement of the levers to the plate, and means for moving the plate inwardly out of the path of travel of the pivoted arm.

5. The combination with the clutch pedal and accelerator rod of a motor vehicle, of a control device comprising a frame, a lever supported by the frame, said lever comprising arms extending at right angles with respect to each other, said lever having an extension below the arms, means connecting the clutch pedal and extension for operating the lever, a rod operated by the lever, means for transmitting movement of the last mentioned rod to the accelerator rod operating the accelerator rod as the clutch pedal moves to its normal position, and means for operating the rod mounted on the frame permitting free movement of the accelerator rod.

6. The combination with the clutch pedal and accelerator rod of a motor vehicle, of an operating mechanism comprising a frame mounted on the motor, a plurality of levers supported by the frame, means for transmitting movement of the clutch pedal to the levers, means for transmitting movement of the levers to the accelerator to operate the accelerator rod when the clutch pedal moves to its normal position, and means for moving the operating mechanism to its inactive position, when the clutch pedal moves to its normal position.

ROBERT E. LEE.